United States Patent [19]
Fergason

[11] Patent Number: 4,556,289
[45] Date of Patent: Dec. 3, 1985

[54] LOW BIREFRINGENCE ENCAPSULATED LIQUID CRYSTAL AND OPTICAL SHUTTER USING SAME

[75] Inventor: James L. Fergason, Kent, Ohio

[73] Assignee: Manchester R & D Partnership, Pepper Pike, Ohio

[21] Appl. No.: 477,078

[22] Filed: Mar. 21, 1983

[51] Int. Cl.[4] ............................................. G02F 1/13
[52] U.S. Cl. ........................... 350/350 R; 350/347 E; 350/349; 252/299.01
[58] Field of Search ............... 350/350 R, 349, 347 E

[56] References Cited

U.S. PATENT DOCUMENTS

| | | | |
|---|---|---|---|
| 3,551,026 | 12/1970 | Heilmeier | 350/150 |
| 3,600,060 | 8/1971 | Churchill | 350/351 |
| 3,694,053 | 9/1972 | Kahn | 350/347 E |
| 3,720,623 | 3/1973 | Cartmell et al. | 252/316 |
| 3,947,183 | 3/1976 | Haas et al. | 350/346 X |
| 4,029,392 | 6/1977 | Moriyama et al. | 350/349 |
| 4,279,152 | 7/1981 | Crossland | 350/340 X |
| 4,435,047 | 3/1984 | Fergason | 350/334 |

FOREIGN PATENT DOCUMENTS

| | | |
|---|---|---|
| 1812479 | 12/1968 | Fed. Rep. of Germany . |
| 1814619 | 12/1968 | Fed. Rep. of Germany . |
| 2017148 | 4/1970 | Fed. Rep. of Germany . |
| 2139537 | 1/1973 | France . |
| 0035685 | 4/1978 | Japan .............................. 350/350 R |
| 0014822 | 1/1982 | Japan .............................. 350/350 R |

OTHER PUBLICATIONS

Chang, R., "The Anisotropic Refractive Indices of Aligned MBBA Liquid Crystal Films," *Molecular Crystals & Liquid Crystals*, vol. 28, pp. 1–8, (1973).

Primary Examiner—John K. Corbin
Assistant Examiner—Richard F. Gallivan
Attorney, Agent, or Firm—Renner, Otto, Boisselle & Lyon

[57] ABSTRACT

Briefly, a liquid crystal material composition has a low, preferably zero or near zero, birefringence characteristic. Such material is mixed with a quantity of pleochroic dye to form a solution therewith to increase absorption characteristics and is encapsulated; and such encapsulated material may be used as an optical light control device or optical shutter in which light intensity may be controlled without distorting or at least without substantially distorting the optical image transmitted therethrough.

56 Claims, 4 Drawing Figures

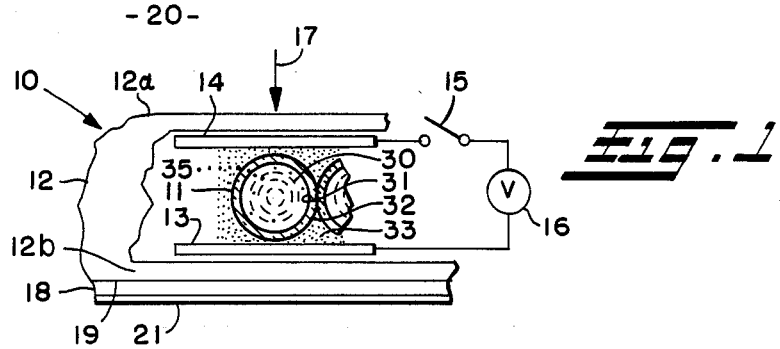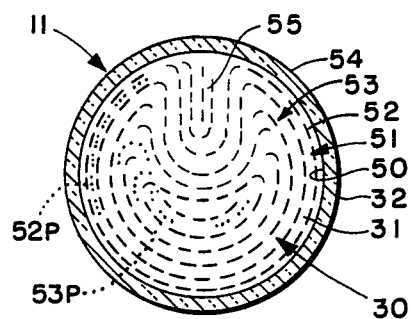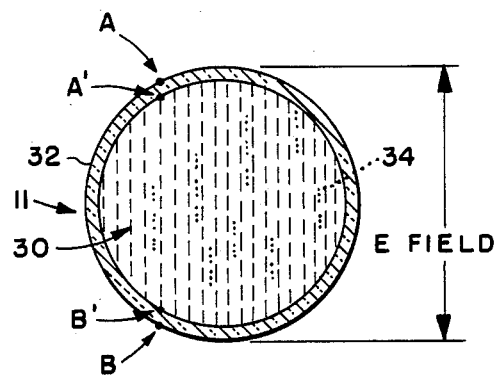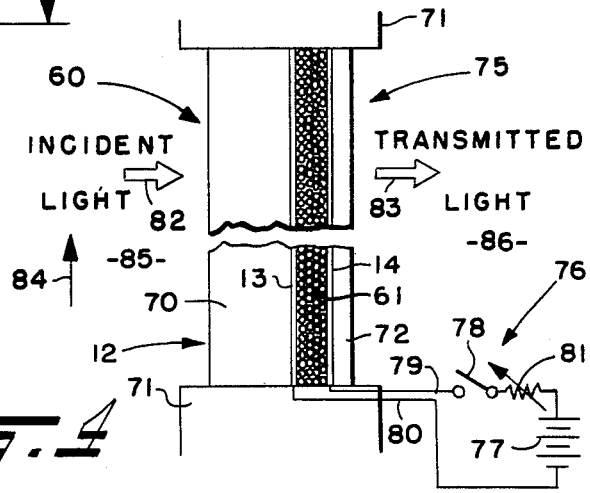

LOW BIREFRINGENCE ENCAPSULATED LIQUID CRYSTAL AND OPTICAL SHUTTER USING SAME

CROSS REFERENCE TO RELATED APPLICATIONS

Related copending, commonly assigned, U.S. Patent Applications are, as follows:

Ser. No. 302,780, U.S. Pat. No. 4,435,047 filed Sept. 16, 1981, for "Encapsulated Liquid Crystal and Method";

Ser. No. 477,242, filed concurrently herewith, for "Encapsulated Liquid Crystal and Method";

Ser. No. 477,138, filed concurrently herewith, for "Enhanced Scattering in Voltage Sensitive Encapsulated Liquid Crystal".

The entire disclosures of such applications are hereby incorporated by reference.

TECHNICAL FIELD

The present invention relates generally to low birefringence liquid crystal material, especially encapsulated liquid crystal material, and to light control devices, such as optical shutters, using such liquid crystal material.

BACKGROUND

Liquid crystals currently are used in a wide variety of devices, including optical devices such as visual displays. Such devices usually require relatively low power, have a satisfactory response time, and are relatively economical. The property of liquid crystals enabling use, for example, in visual displays, is the ability of liquid crystals to transmit light on one hand, and to scatter and/or to absorb light, on the other, depending on the alignment (or lack of alignment) of the liquid crystal structure, for example with respect to an electric field applied across the liquid crystal material. An example of electrically responsive light crystal material and use thereof is provided in U.S. Pat. No. 3,322,485.

Certain liquid crystal material is responsive to temperature, changing optical characteristics in response to temperature of the liquid crystal material. The invention of the present application is disclosed hereinafter particularly with reference to the use of liquid crystal material that is particularly responsive to an electric field.

Currently there are three categories of liquid crystal materials, namely cholesteric, nematic and smectic types. The invention of the present application relates in the preferred embodiment described below to use of liquid crystal material which is operationally nematic (described hereinafter). However, various principles of the invention may be employed with various one or ones of the other known types of liquid crystal material or combinations thereof. The various characteristics of the cholesteric, nematic and smectic types of liquid crystal material are described in the prior art.

One characteristic of nematic liquid crystal material is that of reversibility. Cholesteric material is not reversible. A characteristic of reversibility, in turn, is that the liquid crystal structure will return to its original configuration after an electric field has been applied and removed.

To enhance contrast and possibly other properties of liquid crystal material, pleochroic dyes have been mixed with the liquid crystal material to form a solution therewith. The molecules of the pleochroic dye generally align with the structure of the liquid crystal material. Therefore, pleochroic dyes will tend to function optically in a manner similar to that of the liquid crystal material in response to a changing parameter, such as application or non-application of an electric field. Examples of the use of pleochroic dyes with liquid crystal material are described in U.S. Pat. Nos. 3,499,702 and 3,551,026. The White et al article in *Journal of Applied Physics,* Volume 45, No. 11, November, 1974, at pages 4718-4723, mentions the use of cholesteric liquid crystal material added to nematic liquid crystal material together with pleochroic dye to improve contrast ratio of an optical display formed thereof.

A characteristic typical of liquid crystal material is anisotropy. An anisotropic material has different physical properties in different directions. For example, liquid crystals are usually optically anisotropic, i.e. they have indices of refraction which vary with the direction of propagation and polarization of the incident light. Such characteristic of birefringence is utilized in the encapsulated liquid crystal material, for example, disclosed in the above-referenced applications to improve the scattering and/or absorption of light when in the field-off condition. For example, the liquid crystal material has an index of refraction that is quite different from that of the containment or encapsulating medium for absorption in the field-off condition and that substantially matches that of the containment medium in the field-on condition for transmission of light. Due to such birefringence, though, the integrity, clarity, focusing, and the like of an image intended for transmission through the liquid crystal material becomes nearly impossible, especially when the liquid crystal material is not aligned with respect to an electric field, i.e. field-off condition.

Liquid crystal material also has electrical anisotropy. For example, the dielectric constant for nematic liquid crystal material may be one value when the molecules in the liquid crystal structure are parallel to the electric field and may have a different value when the molecules in the liquid crystal structure are aligned perpendicular to an electric field. Since such dielectric value is a function of alignment, for example, reference to the same as a "dielectric coefficient" may be more apt than the usual "dielectric constant" label. Similar properties are true for other types of liquid crystals.

A discussion of the encapsulation of operationally nematic liquid crystal material is presented in my above copending applications. Some brief discussion of the encapsulation of cholesteric liquid crystal material is presented in U.S. Pat. Nos. 3,720,623; 3,341,466; and 2,800,457, the latter two patents being referred to in the first.

The advantages inuring to use of encapsulated liquid crystal material, especially of the operationally nematic type, for relatively large scale optical displays and light control devices are described in my above copending applications. Several characteristics of such encapsulated liquid crystal material for such use include the effective eliminating of the fluid nature of the material because the liquid crystal material would be contained in discrete or at least relatively discrete containment volumes, such as capsule-like spheres formed in an emulsion with a containment medium. The capsules could be applied uniformly, e.g. at a uniform layer thickness, on a support medium so that the optical and electrical characteristics of the resulting device will be correspondingly uniform, for example. Moreover, if desired, the capsules could be applied only where needed, thus saving on the amount of liquid crystal material required for the given device.

BRIEF SUMMARY OF THE INVENTION

Briefly, a liquid crystal material composition has a low, preferably zero or near zero, birefringence characteristic. Such material is mixed with a quantity of pleochroic dye to form a solution therewith to increase absorption characteristics and is encapsulated; and such encapsulated material may be used as an optical light control device or optical shutter in which light intensity may be controlled without distorting or at least without substantially distorting the optical image transmitted therethrough.

In accordance with one aspect of the invention, a liquid crystal of low birefringence is formed by combining two cholesterol derivatives, one which has a right-handed twist and the other which has a left-handed twist. The different twists effectively cancel the effects of each other yielding a net zero or near zero twist characteristic. Since birefringence is a function of twist, it, too, is brought to zero or near zero. As used herein low birefringence means low, preferably zero or near zero birefringence.

In accordance with another aspect of the invention, pleochroic dye is added to such liquid crystal material to provide a desired optical absorption characteristic for the material.

In accordance with an additional aspect of the invention, such liquid crystal material, preferably containing such pleochroic dye, is encapsulated in discrete capsule-like containment volumes.

In accordance with a further object of the invention, such encapsulated liquid crystal material, preferably containing pleochroic dye, is used as a light control device, such as an optical shutter, for example, by applying the same to a transparent or substantially transparent support medium. In operation such optical shutter may selectively control the intensity or brightness of light transmitted therethrough without or at least substantially without distorting image characteristics of the incident light.

Some terms used herein generally are defined, as follows:

"Liquid crystal material" broadly refers to any type of liquid crystal material that will work in the context of the present invention, but preferably refers to operationally nematic liquid crystal material.

"Operationally nematic" means that in the absence of external fields structural distortion of the liquid crystal is dominated by the orientation of the liquid crystal at its boundaries rather than bulk effects, such as very strong twist as in cholesteric material, or layering as in smectic material. Thus, for example, chiral ingredients which induce a tendency to twist but cannot overcome the effects of boundary alignment still would be operationally nematic. Such operationally nematic material may include pleochroic dyes, chiral compounds or other co-ingredients.

A "capsule" or "capsule-like" refers to a containment device or medium that confines a quantity of liquid crystal material. A "containment" or "encapsulating" medium or material is that medium or material of which such capsules are formed.

An "encapsulated liquid crystal" or "encapsulated liquid material" means a quantity of liquid crystal material confined or contained in discrete volumes, for example, in a solid medium, such as individual capsules or dried stable emulsions.

"Image characteristic" means the image formed by light, for example, the image characteristic of incident light falling onto an optical shutter in accordance with the present invention and selectively and preferably controllably attenuated and transmitted by such an optical shutter.

"Optical shutter" means a light intensity control device that is operative to increase or to decrease the amount of attenuation of the intensity of light transmitted therethrough and, therefore, to control the intensity of the transmitted light. According to the preferred embodiment of this invention, such intensity attenuation (or not) is achieved without or at least substantially without distorting the image characteristic of the incident light.

Capsules according to this invention generally have an approximately spherical configuration (though this is not, per se, a requisite of the invention) having a diameter from about 0.3 to 100 microns, preferably 0.3 to 30 microns, especially 2 to 15 microns, for example 5 to 15 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. Techniques for encapsulation, generally referred to as microencapsulation because of the capsule size, are well known in the art (see, e.g., "Microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

A liquid crystal device is a device formed of liquid crystal material. In the present invention such devices are formed of encapsulated liquid crystals capable of providing a function of the type typically inuring to liquid crystal material; for example, such a liquid crystal device may be a visual display or an optical shutter that in response to application and removal of an electric field effects a selected attenuation of optical radiation, preferably including from far infrared through ultraviolet wavelengths.

One method of making encapsulated liquid crystals includes mixing together liquid crystal material and an encapsulating medium in which the liquid crystal material will not dissolve and permitting formation of discrete capsules containing the liquid crystal material.

A method of making a liquid crystal device including such encapsulated liquid crystal includes, for example, applying such encapsulated liquid crystal material to a substrate. Moreover, such method may include providing means for applying an electric field to the liquid crystal material to affect a property thereof.

According to another feature of the invention an operationally nematic material in which is dissolved a pleochroic dye is placed in a generally spherical capsule. In the absence of an electric field, the capsule wall distorts the liquid crystal structure so it and the dye will tend to absorb light regardless of polarization directions and will, thus, decrease intensity of, or even cut off, light transmission. When a suitable electric field is applied across such a capsule, for example across an axis thereof, the liquid crystal material will tend to align parallel to such field causing the absorption characteristic of such material to be reduced to one assumed when the liquid crystal material is in the planar configuration. To help assure that adequate electric fied is applied across the liquid crystal material in the capsule, and not just across or through the encapsulating medium, and, in fact, with a minimum voltage drop across the wall thickness of the respective capsules, the encapsulating material preferably has a dielectric constant no less than the lower dielectric contact of the liquid crystal material, on the one hand, and a relatively large impedance, on the other hand. Ideally the dielectric constant of the encapsulating material should be as close as possible to the maximum dielectric coefficient of the liquid crystal.

The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for avoiding distortion of the transmitted light and image formed thereby. Because the index of refraction of a material is generally strain-dependent, and strain may be induced in, e.g. the encapsulating medium, it may be necessary to consider this effect in matching the indices of refraction of the liquid crystal, encapsulating medium, and binding medium, if present. Further, if irridescence is to be avoided, it may be desirable to match the indices of refraction over a range of wavelengths to the extent possible, rather than at just one wavelength.

A feature of the spherical or otherwise curvilinear surfaced capsule which confines the liquid crystal material therein in accordance with the present invention is that the liquid crystal material tends to follow the curvature or otherwise to align itself generally parallel with the curved surfaces of such capsule. Accordingly, the liquid crystal structure tends to be forced or distorted to a specific form, being folded back on itself in a sense as it follows the capsule wall, so that the resulting optical characteristic of a given capsule containing liquid crystal material is such that substantially all light delivered thereto will be affected, for example absorbed when pleochroic dye is present, when no electric field is applied, regardless of the polarization direction of the incident light. Even without dye this effect can cause scattering and thus opacity, especially if the liquid crystal material birefringence is not zero.

Another feature is the ability to control the effective thickness of the liquid crystal material contained in a capsule by controlling the internal diameter of such capsule. Such diameter control may be effected by a size fractionation separation process during the making of the encapsulated liquid crystals using any one of a variety of conventional or novel sorting techniques as well as by controlling the mixing process, the quantities of ingredients, and/or the nature of the ingredients provided during mixing. By controlling such thickness parameter to relatively close tolerances, then, the subsequent tolerance requirements when the final liquid crystal device is made using the encapsulated liquid crystals will not be as critical as was required in the past for non-encapsulated devices.

Moreover, a further and very significant feature of the present invention is that there appears to be no limitation on the size of a high quality liquid crystal device that can be made using the encapsulated liquid crystals in accordance with the present invention. More specifically, by providing for confinement of discrete quantities of liquid crystal material, for example, in the described capsules, the various problems encountered in the past that prevented the use of liquid crystal material in large size devices are overcome, for each individual capsule in effect can still operate as an independent liquid crystal device. Moreover, each capsule preferably has physical properties enabling it to be mounted in virtually any environment including one containing a plurality of further such liquid crystal capsules mounted to a substrate or otherwise supported for use in response to application and removal of some type of excitation source, such as, for example, an electric or magnetic. This feature also enables placement of the liquid crystal material on only selected areas of the optical device, such as in large size displays (e.g. including billboards), optical shutters, etc.

Important considerations in accordance with the invention, and the discovery of the inventor, are that an encapsulating medium having electrical properties matched in a prescribed way to the electrical properties of liquid crystal material encapsulated thereby and additionally preferably optically matched to optical properties of such liquid crystal material permits efficient and high quality functioning of the liquid crystal material in response to excitation or non-excitation by an external source; and that the interaction of the encapsulating medium with the liquid crystal material distorts the latter in a prescribed manner changing an operational mode of liquid crystal material. Regarding the latter, by forcing the liquid crystal structure, especially containing pleochroic dye that aligns with the liquid crystal structure, to distort into generally parallel or conforming alignment with the capsule wall, the liquid crystals and pleochroic dye will absorb or block, rather than fully transmit, light when not subject to an electric field and will be functional with respect to all manners of incident light regardless of the direction of polarization, if any, of such incident light. Since the liquid crystal material has low or zero birefringence, as it absorbs incident light it will tend not to distort, e.g. by refraction, the light transmitted therethrough, thereby permitting any image characteristics to be maintained.

With the foregoing in mind, a primary object of the present invention is to provide improvements in liquid crystal apparatus, especially encapsulated liquid crystal apparatus.

Another primary object is to attenuate light transmitted through a liquid crystal optical shutter without distorting or substantially distorting the image characteristic of the incident and transmitted light, and especially to effect such attenuation in a controllable manner.

Another object is to provide the various features and objects of the invention in large size as well as in relatively small size devices, including optical shutters or other light control devices, optical displays, and the like.

An additional object is to improve the versatility of liquid crystal optical devices.

A further object is to provide a method for making a liquid crystal apparatus.

Still another object is to provide a method for controlling the intensity of light transmitted through a material, especially without distorting or substantially distorting the image characteristics of the light.

Still an additional object is to use liquid crystal apparatus in small and large scale devices, especially employing encapsulated liquid crystal material having a low or near zero birefringence characteristic.

Still a further object is to minimize the amount of liquid crystal material required for a particular function, optical device, etc.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWING

In the annexed drawing:

FIG. 1 is a schematic representation of a liquid crystal device in accordance with the present invention;

FIGS. 2 and 3 are enlarged schematic illustrations of a liquid crystal capsule in accordance with the present invention respectively under a no field or field-off condition and under an applied electric field or field-on condition; and FIG. 4 is a schematic representation of an optical shutter in the form of a light control material in accordance with the present invention applied to control the intensity of light transmitted through a window.

DESCRIPTION OF THE PREFERRED EMBODIMENT

Referring in detail to the drawings, wherein like reference numerals designate like parts in the several figures, and initially to FIGS. 1, 2 and 3, encapsulated liquid crystal material used in accordance with the present invention is illustrated. In FIG. 1 is a schematic representation of a liquid crystal apparatus 10 in accordance with the present invention. The apparatus 10 includes encapsulated liquid crystal material 11 represented by a single capsule in FIGS. 1-3. Although the capsules illustrated in the drawings are shown in two dimensions and, therefore, planar form, it will be appreciated that the capsules are three dimensionally, most preferably spherical. The capsule 11 is shown mounted in a preferably transparent support medium 12 having upper and lower portions 12a, 12b which may be separate or integral with each other. The apparatus 10 also includes a pair of electrodes 13, 14 for applying an electric field across the liquid crystal material when a switch 15 is closed to energize the electrodes from a conventional voltage source 16.

It is to be understood that the capsule 11 may be one of many capsules that are discretely formed or, more preferably, that are formed by mixing the liquid crystal material with a so-called encapsulating material or containment medium to form an emulsion, preferably a stable one. The emulsion may be applied to or sandwiched between the support media portions 12a, 12b, and electrodes 13, 14, as is illustrated. If desired, the support medium 12 and the so-called encapsulating material or containment medium may be the same material. As a further alternative, the upper and lower support medium portions 12a, 12b, or one of them, may be a plastic-like, glass, or like, preferably transparent, mounting material. In this latter case the electrodes 13, 14 may be applied to such mounting material and the encapsulated liquid crystal material/emulsion, including many capsules 11, for example, may be sandwiched between such mounting material 12a, 12b to form the apparatus 10, as will be described in further detail below.

The electrode 13 may be, for example, a quantity of vacuum deposited indium tin oxide applied to the lower support medium portion 12b, and the electrode 14 may be, for example, electrically conductive ink applied directly to the liquid crystal material or could be like the electrode 13. Other electrode material and mounting means therefor also may be used for either electrode. Examples include tin oxide and antimony doped tin oxide. Preferably the electrodes are relatively thin, for example, about 200 angstroms thick, and transparent so that they do not significantly affect the optics of the liquid crystal apparatus 10.

The encapsulated liquid crystal material 11 includes liquid crystal 30 contained within the confines or interior volume 31 of a capsule 32. Each capsule 32 may be a discrete one or alternatively the liquid crystal 30 may be contained in a stable emulsion of a containment medium or so-called encapsulating material 33 that tends to form a multitude of capsule-like environments for containing the liquid crystal material. For convenience of illustration, the capsules 32 are shown as discrete capsules in and preferably formed of the overall quantity of containment medium or encapsulating material 33.

The liquid crystal 30 desirably has a low birefringence characteristic. In particular, regardless of the orientation of the liquid crystal structure (e.g. fully aligned with respect to an electric field of a saturation magnitude, in distorted alignment as a function of the wall of a capsule 32 in the absence of an electric field, or at some condition therebetween) the index of refraction thereof will be the same or substantially the same without regard to the direction or polarization of incident light.

Moreover, the index of refraction of the liquid crystal material 30 preferably is matched, i.e. the same or at least substantially the same, as the index of refraction of the containment medium 33. Therefore, refraction, bending, distortion, etc. of light transmitted at an interface thereof will be minimized and preferably eliminated.

Additionally, pleochroic dye 34 preferably is contained, usually by dissolving in solution, in the liquid crystal material 30. The pleochroic dye will absorb light and the amount or percentage of such absorbence will be a function of the structural alignment of the pleochroic dye material. Such structural alignment of the pleochroic dye will follow the structural alignment of the liquid crystal. Therefore, by controlling the removal, application, and intensity of an electric field, the alignment characteristics of the liquid crystal and pleochroic dye can be controlled in turn to control the optical attenuation of the light transmitted through the liquid crystal apparatus 10, for example. Importantly, due to the preferred low birefringence of the liquid crystal 30 and the index of refraction matching distortion of the image characteristics of the incident light, as it is transmitted through the apparatus 10, is minimized and preferably eliminated.

According to the preferred embodiment and best mode of the present invention, the capsule 32 is generally spherical, and the liquid crystal 30 is nematic or operationally nematic liquid crystal material having positive dielectric anisotropy. However, the principles of the invention would apply when the capsule 32 is of a shape other than spherical; such shape and the material thereof should provide the desired optical and electrical characteristics that will satisfactorily coact with the optical characteristics of the liquid crystal material 30, e.g. index of refraction, and will permit an adequate portion of the electric field to occur across the liquid crystal 30 itself for effecting desired ordered or parallel alignment of the liquid crystal when it is desired to have a field-on condition. The shape also should tend to distort the liquid-crystal material when in a field-off or random alignment condition. A particular advantage to the preferred spherical configuration of the capsule 32 is the distortion it effects on the liquid crystal 30 therein when in a field-off condition. This distortion is due, at least in part, to the relative sizes of the capsules and the pitch of the liquid crystal; they preferably are about the same or at least about the same order of magnitude. Moreover, nematic liquid crystal material has fluid-like properties that facilitate the conformance or the distortion thereof to the shape of the capsule wall in the absence of an electric field. On the other hand, in the presence of an electric field such nematic material will relatively easily change to ordered alignment with respect to such field.

Liquid crystal material of a type that is nematic and that which is other than nematic or combinations of various types of liquid crystal material and/or other additives may be used with or substituted for the nematic liquid crystal material as long as the encapsulated liquid crystal is operationally nematic. However, cholesteric and smectic liquid crystal material generally are bulk driven. It is more difficult to break up the bulk structure thereof for conformance to capsule wall shape and energy considerations in the capsule.

Turning to FIGS. 2 and 3, a schematic representation of the single capsule 32 containing liquid crystal 30 is shown, respectively, in the field-off and field-on conditions. The capsules 32 are spherical and have a generally smooth curved interior wall surface 50 defining the boundary for the volume 31. The actual dimensional parameters of the wall surface 50 and of the overall capsule 32 are related to the quantity of liquid crystal 30 contained therein and possibly to other characteristics of the individual liquid crystal material therein. Additionally, the capsule 32 applies a force to the liquid crystals 30 tending to pressurize or at least to maintain substantially constant the pressure within the volume 31. As a result of the foregoing, and due to the surface wetting nature of the liquid crystal, the liquid crystals which ordinarily in free form would tend to be parallel, although perhaps randomly distributed, are distorted to curve in a direction relative to a proximate portion of the interior wall surface 50, for example, parallel to such wall portion as is shown in FIG. 2 or normal as is disclosed in my last mentioned application above. Due to such distortion the liquid crystals store elastic energy. For simplicity of illustration, a layer 51 of liquid crystal and pleochroic dye molecules whose directional orientation is represented by respective dashed lines 52 and dotted lines 52P is shown in closest proximity to the interior wall surface 50. (To avoid cluttering the drawing only a portion of the pleochroic dye is shown.) The directional orientation of the liquid crystal molecules 52 and pleochroic dye molecules 52P is distorted to curve in the direction that is parallel to a proximate area of the wall surface 50. The directional pattern of the liquid crystal and pleochroic dye molecules away from the boundary layer 52, 52P within the capsule is represented by 53, 53P. The liquid crystal and pleochroic dye molecules are directionally represented in layers, but it will be appreciated that the molecules themselves are not confined to such layers. Thus, the organization in an individual capsule is predetermined by the organization of the structure 52 at the wall and is fixed unless acted on by outside forces, e.g. an electric field. On removal of the electric field the directional orientation would revert back to the original one, such as that shown in FIG. 2.

As was noted above, the orientation of the pleochroic dye structure will follow that of the liquid structure. Nematic type material usually assumes a parallel configuration and usually is optical polarization direction sensitive. However, since the material in the encapsulated liquid crystal 11 is distorted or forced to curved form in the full three dimensions of the capsule 32, such operationally nematic liquid crystal material in such capsule takes on an improved characteristic of being insensitive to the direction of optical polarization of incident light. The inventor has discovered, moreover, that since the pleochroic dye tends to follow the same kind of curvature orientation or distortion as that of the individual liquid crystal molecules 52, the percentage or amount of light absorption can be controlled by controlling the alignment structure of the liquid crystal.

The liquid crystal 30 in the capsule 32 has a discontinuity 55 in the generally spherical orientation thereof due to the inability of the liquid crystal to align uniformly in a manner compatible with parallel alignment with the wall 50 and a requirement for minimum elastic energy. Such discontinuity is in three dimensions and is useful to effect a distorting of the liquid crystal 30 further to decrease the possibility that the liquid crystal 30 and pleochroic dye 34 would be sensitive to optical polarization direction of incident light. When the electric field is applied, for example, as is shown in FIG. 3, the discontinuity will no longer exist so that such discontinuity will have a minimum effect on optical transmission when the encapsulated liquid crystal 11 is in a field-on or aligned condition.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering and polarization insensitivity in the field-off condition, which is a feature of this invention.

In the field-on condition, or any other condition which results in the liquid crystal being saturation and, thus, in ordered or parallel alignment, as is shown in FIG. 3, the encapsulated liquid crystal 11 will transmit a maximum of all the light incident thereon, although there may be a minimum attenuation by the pleochroic dye 34 therein. On the other hand, in the field-off condition when the liquid crystal is in distorted alignment, sometimes referred to herein as random alignment, for example as is shown in FIG. 2, a maximum amount of the incident light will be absorbed primarily by the pleochroic dye 34. By varying the magnitude of the electric field between a threshold level at which partial alignment begins and a saturation level at which there is at least substantially full alignment, as is shown in FIG. 3, the attenuation of light transmitted through the apparatus 10 can be controlled and adjusted.

The closeness of the index of refraction matching of the liquid crystal 30 and encapsulating medium 33 will be dependent on the desired degree of transparency in the apparatus 10. Preferably the difference between such indices of refraction will differ by no more than 0.03, more preferably 0.01, especially 0.001 and most preferably zero. The tolerated difference may depend upon capsule size.

According to the preferred embodiment and best mode, desirably the electric field E shown on FIG. 3 is applied to the liquid crystal 30 in the capsule 32 for the most part rather than being dissipated or dropped substantially in the encapsulating material 33. There should not be a substantial voltage drop across or through the material of which the wall 54 of the capsule 32 is formed; rather, the voltage drop should occur across the liquid crystal 30 within the volume 31 of the capsule 32.

The electrical impedance of the encapsulating medium preferably should in effect be large enough relative to that of the liquid crystal in the encapsulated liquid crystal 11 that a short circuit will not occur exclusively through the wall 54, say from point A via only the wall to point B, bypassing the liquid crystal. Therefore, for example, the effective impedance to induced or displacement current flow through or via only the wall 54 from point A to point B should be greater than the impedance that would be encountered in a path from point A to point A' inside the interior wall surface 50, through the liquid crystal material 30 to point B' still within the volume 31, ultimately to point B again. This condition will assure that there will be a potential difference between point A and point B. Such potential difference should be large enough to produce an electric field across the liquid crystal material that will tend to align the same. It will be appreciated that due to geometrical considerations, namely the length through only the wall from point A to point B, for example, such condition still can be met even though the actual impedance of the wall material is lower than that of the liquid crystal material therein.

The dielectric constants (coefficients) of the material of which the encapsulating medium is formed and of which the liquid crystal is comprised, and the effective capacitance values of the capsule wall 54, particularly in a radial direction and of the liquid crystal across which the electric field E is imposed, all should be so related that the wall 54 of the capsule 32 does not substantially drop the magnitude of the applied electric field E. Ideally the capacitance dielectric constants (coefficients) of the entire layer 61 (FIG. 4) of encapsulated liquid crystal material should be substantially the same for the field-on condition.

The liquid crystal 30 will have a dielectric constant value that is anisotropic. It is preferable that the dielectric constant (coefficient) of the wall 54 be no lower than the dielectric constant (coefficient) of the anisotropic liquid crystal material 30 to help meet the above conditions for optimum operation. It is desirable to have a relatively high positive dielectric anisotropy in order to reduce the voltage requirements for the electric field E. The differential between the dielectric constant (coefficient) for the liquid crystal 30 when no electric field is applied, which should be rather small, and the dielectric constant (coefficient) for the liquid crystal when it is aligned upon application of an electric field, which should be relatively large, should be as large as possible. The dielectric constants (coefficients) relationships are discussed in the concurrently filed application, the entire disclosure of which is specifically incorporated by reference here. It should be noted, in particular, though, that the critical relationship of dielectric values and applied electric field should be such that the field applied across the liquid crystal material in the capsule(s) is adequate to cause alignment of the liquid crystal structure with respect to the field. The lower dielectric values of commonly used liquid crystals are, for example, from as low as about 3.5 as high as about 8.

The capsules 32 may be of various sizes. The smaller the size, though, the higher the requirements will be for the electric field to effect alignment of the liquid crystal in the capsule. Preferably, though, the capsules should be of uniform size parameters so that the various characteristics, such as the optical and electrical characteristics, of an apparatus, such as a display, using the encapsulated liquid crystal will be substantially uniform. Moreover, the capsules 32 should be at least 1 micron in diameter so they appear as discrete capsules relative to an incident light beam; a smaller diameter would result in the light beam "seeing" the capsules as a continuous homogeneous layer and would not undergo the required isotropic scattering. Examples of capsule sizes, say from 1-30 microns diameter, and of liquid crystal material are in the above concurrently filed application and are hereby specifically incorporated by reference.

The characteristic of low near zero, or even zero birefringence in an operationally nematic liquid crystal material has been found to be obtainable by combining plural liquid crystal materials that have opposite twist or pitch characteristics. Therefore, according to the preferred embodiment and best mode the selected liquid crystal material or mixtures thereof shall have such characteristics. For example, a mixture of two cholesterol derivatives, one having a righthanded twist and the other a lefthanded twist at about the same amount as the former, will produce a liquid crystal mixture having a net zero twist regardles of whether the liquid crystal structure is aligned with an electric field or in distorted alignment with respect to the capsule wall.

The encapsulating medium forming respective capsules 32 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized, molecular weight of at least about 1,000, resin. Use of a PVA of Monsanto Company identified as Gelvatol 20/30 represents the best mode of the invention.

A method for making emulsified or encapsulated liquid crystals 11 may include first mixing together liquid crystal materials having opposite twist to obtain the low birefringence liquid crystal mixture and then mixing together the containment or encapsulating medium, the liquid crystal material mixture, and perhaps a carrier medium, such as water. Mixing may occur by hand or, more preferably, in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 32 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing.

The capsule size (diameter) prreferably should be uniform in the emulsion for uniformity of operation with respect to effect on incident light and response to electric field. Exemplary capsule size range may be from about 0.3 to about 100 microns, preferably 0.3 to 30 microns, especially 3 to 15 microns, for example 5 to 15 microns.

Various techniques may be employed to form the support medium 12, which may be of the same or similar material as the encapsulating or containment medium. For example, the lower support medium 12b may be formed using a molding or casting process. The electrode 13 and liquid crystal material may be applied for support by that medium 12b. The electrode 14 may be applied, e.g. by printing. Thereafter, the upper support medium portion 12a may be poured or cast in place to complete enclosing the encapsulated liquid crystal material and the electrodes. Alternatively, the support medium portions 12a, 12b may be a substantially transparent plastic-like film or a plate of glass, for example.

In accordance with the invention, the preferred support medium 12 is Mylar material having a transparent Intrex electrode thereon. Other types of support media 12 that may be used include polyester materials; and polycarbonate material, such as Kodel film. Tedlar film, which is very inert, also may be used if adequate adhesion of the electrode can be accomplished. Such media 12 preferably should be substantially optically transparent.

In accordance with the invention, several different containment media that may be used are listed in Chart I below. The chart also indicates several characteristics of the respective media.

with the present invention are indophenol blue, Sudan black B, Sudan 3, and Sudan 2; and D-37, D-43 and D-85 by E. Merck Chemicals, Darmstadt, West Germany.

A prefereed quantity ratio of liquid crystal material to containment medium is about one part by weight liquid crystal material to about three parts by weight of containment medium. Acceptable encapsulated liquid crystal emulsion operative according to the invention also may be achieved using a quantity ratio of about one part liquid crystal material to about two parts containment medium, e.g., Gelvatol PVA. Moreover, although a 1:1 ratio also will work generally it will not function quite as well as material in the ratio range of from about 1:2 to about 1:3.

Turning now to FIG. 4, a portion 60 of a liquid crystal light control device in the form of an optical shutter device in accordance with the present invention is illustrated. The device 60 is an application of the liquid crystal apparatus 10 described above with reference to FIG. 1 in that plural encapsulated liquid crystals 11, indeed plural layers thereof, are contained in or mounted on a support medium 12. The sizes, thicknesses, diameters, etc., of the several parts shown in FIG. 4 are not necessarily to scale; rather the sizes are such as is necessary to illustrate the several parts and their operation, as is described below, in accordane with the invention.

The electrodes 13, 14 are employed to apply a desired electric field to effect selective alignment of the liquid crystal material in the manner shown in FIG. 3, for example. Means other than electrodes may be employed to apply some type of input to the device 60 for the purpose of effecting ordered or random alignment of the liquid crystal and, thus, of the pleochroic dye.

The encapsulated liquid crystals 11 are arranged in several layers 61 within the display portion 60. The layers 61 may be divided into several portions representing the various areas at which light is to be controllably attenuated by the device 60. Subsequent reference to layers 61 will be in the collective, i.e. referring to layer 61 as including the several levels or layers comprising the same. As an example, the composite thickness of such layer 61 may be from about 0.3 mils to about 10 mils; uniform thickness is preferred for uniform response to electric field.

CHART I

| Containment Medium | Viscosity | % Hydrolyzed | Molecular Weight | Temperature & % Solutions |
|---|---|---|---|---|
| 20/30 Gelvatol, by Monsanto Company | 4–6 CPS | 88.7–85.5 | 10,000 | 4% at 20° C. |
| 40/20 Gelvatol, by Monsanto Company | 2.4–3 CPS | 77–72.9 | 3,000 | 4% at 20° C. |
| 523, by Air Products And Chemicals, Inc. | 21–25 | 87–89 | — | 4% at 20° C. |
| 72/60 Elvanol, by DuPont Co. | 55–60 | 99–100 | — | 4% at 20° C. |
| 405 Poval, by Kurashiki | 2–4 CPS | 80–62 | — | 4% at 20° C. |
| Carbopole, by B. F. Goodrich Chemical Company | | | | |

Examples of pleochroic dyes that may suitably be used in the encapsulated liquid crystals 11 in accordance It is significant to note that such an arrangement of encapsulated liquid crystal material layer 61 is facilitated, or even made possible, due to the encapsulating or confining of the liquid crystal in discrete containment media, such as is formed by the preferred stable emulsion thus preventing free flowing of the liquid crystal over the surface of the medium 12. Therefore, especially on a relatively large size optical shutter or other devices encapsulated liquid crystal may be uniformly distributed and maintained in position on a support medium.

In the optical shutter 60 one part of the support medium 12b is formed by a transparent material 70, such as a sheet of glass mounted in a window frame 71, say in the wall of a building. The electrode 13 may be an Intrex film or other transparent electrode material adhered to a surface of the glass 70, and the layer 61 of encapsulated, operationally nematic, low birefringence liquid crystal material containing pleochroic dye is applied to such electrode 13. The other electrode 14 is applied to the opposite surface of the layer 61 relative to the electrode 13, and a protective sheet of material 72, which forms the other part of the support medium 12, for example, is applied, as is shown, in abutment with the electrode 14. The material 72 also may be a sheet of glass, plastic, or other material or even may be eliminated altogether, if desired, assuming that the electrode 14 and/or the layer 61 does not need additional protection. Preferably the indices of refraction of the materials 70, 72 and those included in the layer 61 are the same or substantially the same to minimize refraction at various interfaces and, thus, to minimize distortion of any image seen through the window assembly 75.

An electric control circuit, schematically represented at 76 in FIG. 4, may be used to apply power for establishing an electric field between the electrodes 13, 14 and, thus, across the layer 61. The circuit 76 may include a battery 77 or other electric power source, an on-off switch 78 for selectively opening and closing the circuit 76 with respect to wires or other electrically conductive leads 79, 80 which couple the opposite polarity sides of the battery 77 to the respective electrodes 13, 14. A conventional potentiometer, rheostat, variable resistor, or the like is shown at 81. Such device 81 is intended to be selectively adjustable in order to control the magnitude of the voltage applied across the leads 79, 80 and, therefore, the magnitude of the electric field applied across the layer 61.

In operation of the optical shutter 60 in accordance with the present invention, the switch 78 may be closed and the potentiometer 81 adjusted to provide maximum or saturation level voltage to the electrodes 13, 14 effecting an electric field that substantially completely aligns the structure of the liquid crystal material in the layer 61. As a result, the also aligned pleochroic dye will have a minimum absorbence characteristic with respect to incident light represented at 82. Accordingly, when a maximum or saturation level electric field is applied across the layer 61, the intensity of the transmitted light 83 will be at a maximum. It is important to note that due to the above requirement of low birefringence, an image, such as that shown at 84 on the viewed or incident side 85 and effectively carried by the light transmitted through the window assembly 75 will be viewable and substantially undistorted as viewed from the viewing side 86 of the window assembly. The potentiometer 81 may be adjusted, for example manually, to reduce the magnitude of the electric field, and such an adjustment will result in a reduction in the intensity of the transmitted light 83 because a larger portion of the incident light 82 will be absorbed by the pleochroic dye in the layer 61, as was described above.

In view of the foregoing, it will be appreciated that the invention may be used to adjust the intensity of light transmitted through a medium, such as a window assembly 75 or any other optically transparent or substantially transparent material. By adjusting and/or controlling the electric field magnitude, the intensity of transmitted light, i.e. transmitted in either direction through the assembly 75, can be correspondingly adjusted or controlled.

It will be appreciated that the layer 61 and electrode 13 may be applied directly to an existing window pane 70, say already in a window frame 71, or it may be applied during the manufacturing of such material 70. Alternatively, a support medium 12 of, for example, Mylar sheets or other preferably optically transparent material may be used as the medium 12 for supporting and protecting the electrodes 13, 14 and layer 61 as an assemblage along the lines shown, for example, in FIG. 1. Then such assemblage may be applied to a sheet of glass or other preferably optically transparent or substantially transparent material.

The following example demonstrates a method of making an encapsulated low birefringence operationally nematic liquid crystal material containing pleochroic dye in accordance with the present invention and the operation of such material.

EXAMPLE 1

In order to obtain a liquid crystal of low birefringence it was necessary to use a mixture of two cholesterol derivatives, one cholesteryl chloride which is right-handed and the other cholesteryl oleate which is left-handed. These were 50%/50% w/w (weight to weight) mixture and produced a nematic phase with a birefringence of 0.029. To the resulting material 0.390% w/w Sudan III and 0.5% w/w Sudan Black B were added resulting in a near black liquid crystal.

The material had a small positive dielectric anisotropy which was increased by adding 10% Cyanophenylo 4 butyl-cyclohexanoate. 5 grams of the resulting material was emulsified in 15 grams of a 22% solution of 20/30 Gelvatol (a polyvinyl alcohol—PVA—of Monsanto Company) using medium shear.

The resulting emulsion was cast using a doctor blade at a gap setting of 5 mils. A 1.2 mil film was obtained on drying. The film was clear but absorbing. When an electric field was applied, the absorption began to decrease at an applied field of 20 volts and was at a minimm absorbance at 120 volts.

It will be appreciated that the present invention may be used in a variety of applications for the purpose of controlling the transmission of light through optically transparent or substantially transparent materials, such as glass, plastic, fluids, etc. The nature of the light absorbed by the pleochroic dye will, of course, be a function of the nature of the pleochroic dye. For example, if the dye were a black dye, it would absorb light in all or substantially all of the visible and adjacent wavelengths. Absorption and transmission characteristics may be in either direction. On the other hand, if the dye were of a particular color, the absorbency characteristic would be correspondingly altered.

STATEMENT OF INDUSTRIAL APPLICATION

In view of the foregoing it will be appreciated that the present invention may be used to control the transmission of light through a medium preferably without distorting image characteristics.

I claim:

1. A method of making a light control device of low birefringence liquid crystal material comprising mixing low birefringence liquid crystal material and an encapsulating medium to form an emulsion of capsule-like containment media containing discrete quantities of liquid crystal material, and adding pleochroic dye to the mixture of low birefringence liquid crystal material.

2. The method of claim 1, further comprising making said liquid crystal material by mixing at least two liquid crystal materials, one having one twist characteristic and one having an opposite twist characteristic, whereby such twist characteristics substantially cause a near zero effective twist characteristic for the combined material.

3. The method of claim 2, further comprising applying the overall mixture to a generally optically transmissive support for controlling light transmission through said support.

4. A method of controlling light transmitted through a medium having an optically transparent characteristic comprising applying to such medium an encapsulated low birefringence operationally nematic liquid crystal material containing pleochroic dye, and controlling the direction of the pleochroic dye without substantially scattering light having an image characteristic impinging on such liquid crystal and pleochroic dye thereby to control the intensity of transmitted light while substantially preserving the image of such transmitted light.

5. The method of claim 4, further comprising distorting the natural structure of such liquid crystal material by such containment medium thereby to distort the pleochroic dye to increase light absorption by such dye.

6. The method of claim 5, further comprising applying a controlled electric field across said encapsulated liquid crystal material to control alignment of liquid crystal structure and pleochroic dye thereby to control the intensity of transmitted light.

7. The method of claim 4, wherein such encapsulated liquid crystal material is formed of liquid crystal material and a containment medium, such containment medium having an index of refraction, and further comprising selecting such low birefringence operationally nematic liquid crystal material and such containment medium such that the difference between the indices of refraction thereof is no greater than about 0.03.

8. The method of claim 4, further comprising mixing low birefringence operationally nematic liquid crystal material with an encapsulating medium to form with such liquid crystal material such encapsulated low birefringence operationally nematic liquid crystal material, and selecting such low birefringence liquid crystal material and containment medium to have indices of refraction that differ by from 0 to about 0.03.

9. An optical apparatus through which an image may be clearly viewed in all operational modes of said apparatus, comprising a low birefringence encapsulated liquid crystal material of operationally nematic liquid crystal in a containment medium, and pleochroic dye in said liquid crystal material.

10. The apparatus of claim 9, said low birefringence liquid crystal material comprising a mixture of at least one liquid crystal material having one twist characteristic and at least one liquid crystal material having an opposite twist characteristic.

11. The apparatus of claim 10, wherein each of said liquid crystal materials is operationally nematic or the combination thereof is operationally nematic.

12. The apparatus of claim 11, each of said liquid crystal materials comprising a cholesterol derivative.

13. The apparatus of claim 10, at least one of said liquid crystal materials comprising cholesteryl chloride and at least one comprising cholesteryl oleate.

14. The apparatus of claim 9, said low birefringence encapsulated liquid crystal material having a characteristic that it does not substantially distort image characteristic of light transmitted therethrough.

15. The apparatus of claim 9, further comprising electrode means for applying an electric field across at least some of such liquid crystal material.

16. The apparatus of claim 15, further comprising electrical circuit means for providing electrical power to said electrode means.

17. The apparatus of claim 9, said encapsulated liquid crystal material comprising an emulsion of liquid crystal material in a containment medium, and wherein the indices of refraction of said liquid crystal material and said containment medium are at least substantially matched to minimize distortion of light transmitted through an interface thereof.

18. A light control film comprising the apparatus of claim 9.

19. An optical shutter formed of the liquid crystal apparatus of claim 9.

20. The optical shutter of claim 18, said liquid crystal material comprising a layer of the same mounted with respect to a support through which light may be transmitted.

21. The shutter of claim 19, further comprising a support medium having light transmitting characteristics and said optical shutter being mounted with respect to said support medium to control the intensity of transmitted light.

22. The shutter of claim 21, said low birefringence encapsulated liquid crystal material being operative to control the intensity of light transmitted in both directions through said support medium.

23. The apparatus of claim 9, wherein said liquid crystal material controls the direction of said pleochroic dye without substantial scattering of light impinging thereon.

24. The apparatus of claim 9, said containment medium having an index of refraction, and wherein the difference between the index of refraction of said liquid crystal material and the index of refraction of said containment medium is about 0.03 or less.

25. The apparatus of claim 9, wherein said liquid crystal material is operationally nematic.

26. An optical apparatus comprising a low birefringence liquid crystal material in a containment medium, pleochroic dye in said liquid crystal material, said containment medium having an index of refraction, and the indices of refraction of said liquid crystal material and of said containment medium being substantially matched to minimize distortion of light transmitted through an interface thereof.

27. The apparatus of claim 21, said containment medium bounding a plurality of volumes for containing said liquid crystal material and forming therewith encapsulated liquid crystal.

28. The apparatus of claim 27, said containment medium and liquid crystal material forming an emulsion.

29. The apparatus of claim 27, wherein the difference between the index of refraction of said containment medium and the index of refraction of said liquid crystal material is about 0.03 or less.

30. The apparatus of claim 27, said containment medium being substantially optically transparent.

31. The apparatus of claim 27, said volumes having walls, and wherein said walls distort the natural structure of said liquid crystal material in the absence of an electric field, and wherein said dye aligns with respect to the structure of said liquid crystal material, whereby absorption of light by said dye is a function of alignment of the liquid crystal structure.

32. The apparatus of claim 31, further comprising electrode means for applying electric field to at least some of said liquid crystal material to effect generally parallel alignment thereof with respect to such field.

33. The apparatus of claim 32, further comprising circuit means for energizing said electrode means to apply such field to said liquid crystal material.

34. The apparatus of claim 27, wherein said liquid crystal material is operationally nematic.

35. The apparatus of claim 26, said liquid crystal material comprising a mixture of at least one liquid crystal material having one twist characteristic and at least one liquid crystal material having an opposite twist characteristic.

36. The apparatus of claim 35, wherein each of said liquid crystal materials is operationally nematic or the combination thereof is operationally nematic.

37. The apparatus of claim 35, each of said liquid crystal materials comprising a cholesterol derivative.

38. The apparatus of claim 35, at least one of said liquid crystal materials comprising cholesteryl chloride and at least one comprising cholesteryl oleate.

39. The apparatus of claim 35, one twist being lefthanded and the other being righthanded.

40. The apparatus of claim 35, said containment medium comprising polyvinyl alcohol.

41. The apparatus of claim 26, further comprising a support medium having light transmitting characteristics and said optical shutter being mounted with respect to said support medium to control the intensity of transmitted light.

42. The apparatus of claim 41, said low birefringence encapsulated liquid crystal material being operative to control the intensity of light transmitted in both directions through said support medium.

43. An optical shutter formed of the apparatus of claim 26.

44. The optical shutter of claim 43, said liquid crystal material comprising a layer of the same mounted with respect to a support through which light may be transmitted.

45. The optical shutter of claim 44, further comprising electrode means for applying an electric field across said layer of such liquid crystal material.

46. The shutter of claim 45, further comprising electrical circuit means for providing electrical power to said electrode means.

47. An electro-optical attenuator through which an image may be clearly viewed in all operational modes of said attenuator, comprising a low birefringence encapsulated liquid crystal material and pleochroic dye in said liquid crystal material.

48. A light control apparatus comprising a low birefringence liquid crystal material, and a containment medium means for containing said liquid crystal material as encapsulated liquid crystal, said containment medium having an index of refraction, and wherein the difference between the index of refraction of said liquid crystal material and the index of refraction of said containment medium means is no greater than about 0.03.

49. A method of making a low birefringence liquid crystal material comprising mixing together at least one liquid crystal material having one twist characteristic and at least one liquid crystal material having an opposite twist characteristic, said mixing comprising mixing two cholesterol derivatives that function in an operationally nematic manner, one of such cholesterol derivatives comprising cholesteryl chloride and the other comprising cholesteryl oleate.

50. A method of making a device for controlling light transmission with minimum distortion of the transmitted light, comprising selecting a liquid crystal material having a low birefringence characteristic and a containment medium having an index of refraction such that the difference between the indices of refraction of such liquid crystal material and such containment medium is no greater than about 0.03, mixing pleochroic dye with such low birefringence liquid crystal material, and mixing such low birefringence liquid crystal material containing pleochroic dye and an encapsulating medium to form plural capsule-like containment media containing such liquid crystal material and dye.

51. The method of claim 50, further comprising making said liquid crystal material by mixing at least two liquid crystal materials, one having one twist characteristic and one having an opposite twist characteristic, whereby such twist characteristic substantially cause a near zero effective twist characteristic for the combined material.

52. The method of claim 51, further comprising applying the overall mixture to a generally optically transmissive support for controlling light transmission through said support.

53. A method of making an optical apparatus, comprising mixing a low birefringence liquid crystal material containing a pleochroic dye and a containment medium to form contained volumes of liquid crystal and pleochroic dye, and selecting said liquid crystal material and said containment medium such that the indices of refraction thereof are substantially matched to minimize distortion of light transmitted through an interface thereof.

54. A method of making a light control device of low birefringence liquid crystal material comprising mixing low birefringence liquid crystal material and an encapsulating medium to form an emulsion of capsule-like containment media containing discrete quantities of liquid crystal material, and adding pleochroic dye to the mixture of low birefringence liquid crystal material.

55. The method of claim 29, further comprising making a mixture of at least two liquid crystal materials, one having one twist characteristic and one having an opposite twist characteristic, whereby such twist characteristics substantially cause a near zero effective twist characteristic for the combined material.

56. The method of claim 55, further comprising applying the overall mixture to a support for controlling light transmission.

* * * * *

UNITED STATES PATENT OFFICE
CERTIFICATE OF CORRECTION

Patent No. 4,556,289　　　　　　　　　　Dated December 3, 1985

Inventor(s) James L. Fergason

It is certified that error appears in the above-identified patent and that said Letters Patent are hereby corrected as shown below:

At column 18, line 33, "18" should read --19--.

At column 18, line 65, "21" should read --26--.

At column 20, line 58, "29" should read --54--.

Signed and Sealed this

Twenty-fifth Day of March 1986

[SEAL]

Attest:

DONALD J. QUIGG

Attesting Officer　　Commissioner of Patents and Trademarks